Feb. 1, 1944.   P. E. BJORK   2,340,507
VISCOSIMETER
Filed Dec. 2, 1941   2 Sheets-Sheet 1
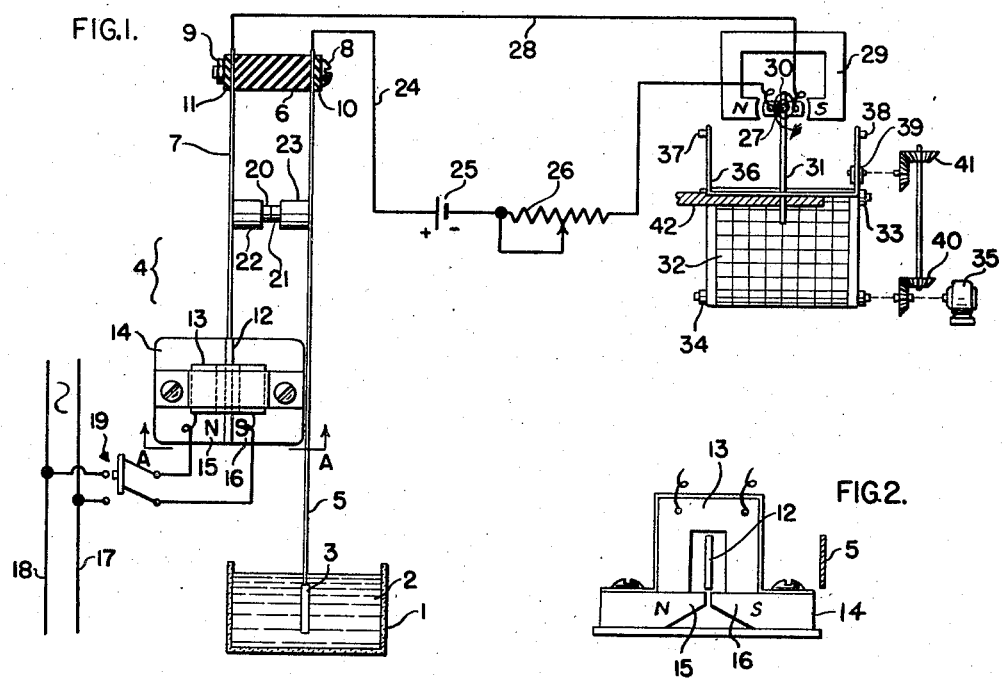
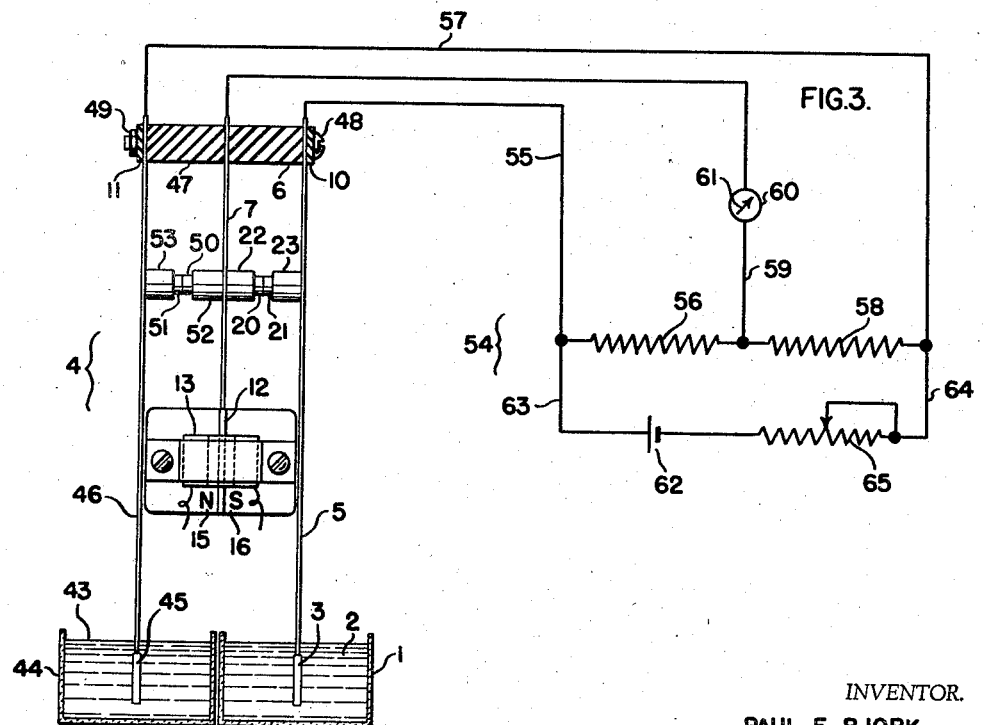
INVENTOR.
PAUL E. BJORK
BY
ATTORNEY Feb. 1, 1944.  P. E. BJORK  2,340,507
VISCOSIMETER
Filed Dec. 2, 1941  2 Sheets-Sheet 2
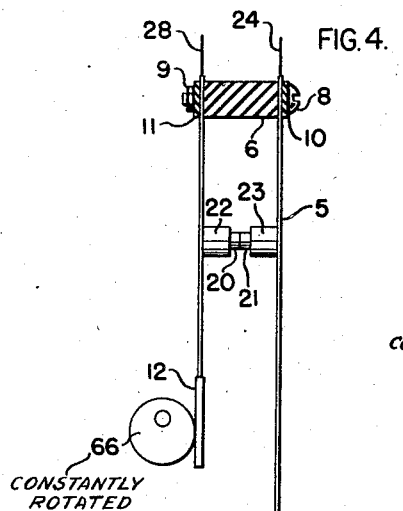
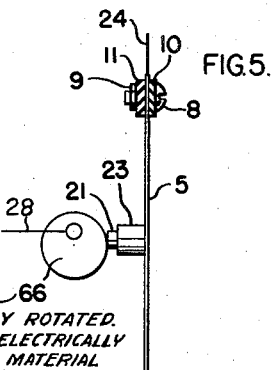
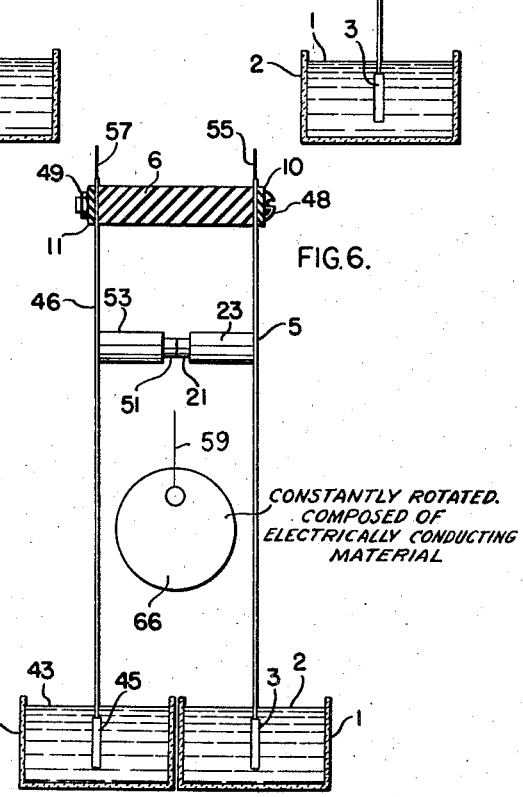
INVENTOR.
PAUL E. BJORK
BY
ATTORNEY Patented Feb. 1, 1944

2,340,507

UNITED STATES PATENT OFFICE 2,340,507

VISCOSIMETER

Paul E. Bjork, Philadelphia, Pa., assignor to The Brown Instrument Company, Philadelphia, Pa., a corporation of Pennsylvania Application December 2, 1941, Serial No. 421,258

17 Claims. (Cl. 265—11)

The present invention relates to an improved method of and apparatus for measuring the viscosity of fluids.

An object of the invention is to provide a new and improved method of obtaining a continuous measurement and indication of the viscosity of fluids.

Another object of the invention is to provide improved apparatus which is capable of continuously measuring and/or recording the viscosity of fluids and which is characterized by its simplicity and effectiveness.

The viscosity of a fluid is generally defined as the resistance offered by the fluid to the relative motion of the particles of which it is composed. Stated differently, the viscosity of a fluid is the property of the fluid producing resistance to change in its form. The mathematical concept of viscosity is the quotient of shearing force per unit area divided by the rate of variation of velocity with respect to distance along a perpendicular to the plane at and along which the shearing force is measured. The mathematical definition of viscosity, in unit quantities, is the force per unit area per unit velocity per unit distance from a surface at which velocity is zero.

A further and more specific object of the present invention is to provide viscosity measuring apparatus in which the measurement obtained is more nearly in accord with the mathematical definition of viscosity.

The various features of novelty which characterize my invention are pointed out with particularity in the claims annexed to and forming a part of the specification. For a better understanding of the invention, however, and the advantages and specific objects attained with its use, reference should be had to the accompanying drawings and descriptive matter in which I have illustrated and described a preferred embodiment of the invention.

Of the drawings:

Fig. 1 represents schematically one embodiment of the invention;

Fig. 2 is a view along the lines A—A in Fig. 1;

Fig. 3 is a schematic illustration of a modification of the arrangement of Fig. 1;

Figs. 4 and 5 illustrate modifications of the arrangements of Fig. 1; and

Fig. 6 illustrates a modification of the arrangement of Fig. 3.

Referring now to the drawings in which like reference characters are used to designate like parts throughout, the reference character 1 designates a receptacle or container for holding a sample of a fluid or liquid 2 the viscosity of which it is desired to ascertain. A paddle or vane 3 is disposed in the fluid 2 and is adapted to be rapidly moved to and fro in the fluid by means of a reciprocator or vibrator indicated generally by the reference numeral 4. To this end the paddle 3 is rigidly secured to the lower end of a vertically depending reed 5 which is supported at its upper end by a stationary electrical insulating block 6. The block 6 also supports a second vertically depending reed 7 which, as shown in the drawings, is somewhat shorter than the reed 5 although it will be understood that if desired the reeds 5 and 7 may be of the same length or the reed 7 may even be longer than the reed 5. The reeds 5 and 7 are flexible and are adapted when deflected from the position shown to spring back to that position. As shown the reeds 5 and 7 may desirably be rigidly connected to the block 6 by means of a bolt 8 which extends through the block 6 and is provided with a nut 9 for facilitating the assembly of the arrangement. The bolt 8 and nut 9 are electrically insulated from reeds 5 and 7 by electrically insulated washers 10 and 11. The reeds 5 and 7 are preferably composed of electrically conducting material although, as will appear hereinafter, they may be composed of electrically non-conducting material, if desired.

The reed 7 comprises the vibrating element of the reciprocator 4 referred to hereinbefore and is provided with a soft iron member 12 at the lower end thereof which extends in the direction of the reed as shown. The member 12 is disposed in cooperative relation with a coil 13 and a permanent magnet 14 having north and south poles 15 and 16, respectively. The poles 15 and 16 are arranged closely adjacent each other as seen in Fig. 1 and as shown in more detail in Fig. 2. Portions of the pole faces 15 and 16 are cut away as shown in Fig. 2 for the purpose of concentrating the magnetic flux between the poles near the upper surface of the magnet 14 and closely adjacent the iron member 12.

The member 12 extends through the coil 13 which is energized with alternating current from alternating current supply conductors 17 and 18 through a double pole single throw switch 19. Thus, the member 12 is adapted to be alternately magnetized in reverse directions by the coil 13. That is to say, during one half cycle of the alternating current flow in the coil 13, the upper end of member 12 is made a north pole and the lower end is made a south pole, and during the succeeding half cycle of the alternating current flow in coil 13, the upper end of member 12 is made a south pole and the lower end is made a north pole. This alternating magnetization of the member 12 is in synchronism with the alternating current flowing through and energizing the coil 13.

When the lower end of the member 12 is a north pole a force of repulsion exists between this end of member 12 and the pole 15 of the magnet 14, which pole 15, as noted hereinbefore, is a north pole. At the same time a force of attraction exists between the lower end of the member 12 and the south pole 16 of the magnet 14. As a result the lower end of member 12 is actuated to the right as seen in Fig. 1. This causes a deflection of the reed 7 to the right.

In the next half cycle of the alternating current supplied the coil 13 the lower end of the member 12 will become a south pole and at this time a force of repulsion will exist between the lower end of member 12 and the south pole 16 while a force of attraction will exist between the lower end of member 12 and the north pole 15. Consequently, the member 12 and thereby the reed 7 will be deflected to the left as seen in the drawings.

By virtue of this operation the reed 7 will alternately be deflected to the right and to the left in synchronism with the alternating current supplied the coil 13. When the current supplied the coil 13 from the supply line 17 and 18 is 60 cycle alternating current the reed 7 therefore will be given 60 right and left deflections per second. In other words, the reed 7 will be given sixty complete reciprocatory movements during each second. If desired, the coil 13 may be energized with alternating current of 25 cycles in which case the reed 7 will be given 25 complete reciprocatory or oscillatory movements during each second.

The reed 7 is provided at a point intermediate its ends with a contact 20 and the reed 5 is also provided at a point intermediate its ends with a contact 21. The contacts 20 and 21 are so located along their respective reeds that they are adapted to engage each other. The contacts 20 and 21 are supported by electrically conducting blocks 22 and 23 respectively, to which they are rigidly connected in any convenient manner and which are provided so as to effect engagement between the contacts 20 and 21 when the reeds 5 and 7 are in their undeflected positions. The blocks 22 and 23 are rigidly fastened in any suitable manner to their associated reeds 7 and 5.

The reed 5 is connected by an electrical conductor 24, in which a battery 25 and a rheostat 26 are inserted, to one terminal of a galvanometer coil 27. The other terminal of the galvanometer coil 27 is connected by an electrical conductor 28 to the reed 7. If the reeds 5 and 7 are composed of electrically non-conducting material the conductors 24 and 28 may be connected to the contacts 20 and 21 through suitable pig tails. The galvanometer coil 27 is disposed between the poles of a permanent magnet indicated by the reference numeral 29 and when deenergized is held in a predetermined position relatively to the magnet 29 by means of a spiral spring 30.

When the contacts 20 and 21 are in engagement with each other as shown, an electrical circuit is completed from the one terminal of the battery 25 through the conductor 24, reed 5, contact 20, reed 7, conductor 28, galvanometer coil 27 and rheostat 26 back to the other terminal of the battery 25. The resulting flow of current through the galvanometer coil 27 causes a deflection of the latter in one direction from the predetermined position against the opposing action of the spiral spring 30. Upon disengagement of the contacts 20 and 21 this circuit is broken and the flow of current to the galvanometer coil 27 is interrupted. The galvanometer coil 27 then will tend to be returned to the predetermined position referred to by the spiral spring 30.

In the operation of the apparatus, when the reed 7 is deflected toward the right by the operation of the reciprocator 4 the reed 5 will also be deflected toward the right against the restraining action of the fluid 2 on the paddle 3 and also against the restraining action of the reed 5 itself. The reed 5 will be so deflected because in the normal undeflected position of the reeds 5 and 7 the contacts 20 and 21 are in engagement with each other and consequently, when the reed 7 is deflected toward the right the reed 5 will also be actuated toward the right.

During the next half cycle of the alternating current energizing the coil 13 the reed 7 of reciprocator 4 will be deflected toward the left, and therefore, the force actuating the reed 5 to the right is removed and the reed 5 will be permitted to return to its normal undeflected position. The force operating to so return the reed 5 to its undeflected position may be the resilient action of the reed 5 itself although separate spring means, not shown, may be provided for this purpose, if desired. This returning force must work against the restraining action of the fluid 2 against the paddle 3, and consequently, the rate at which the reed 5 returns to its normal undeflected position is dependent upon the viscosity, or its inverse, the fluidity, of the fluid 2. Inasmuch as there is a tendency for the contact between the contacts 20 and 21 to be broken when the reed 7 is deflected to the left following a deflection to the right, it will be apparent that the duration of engagement between the contacts 20 and 21 is determined by the rate at which the reed 5 can return to its normal undeflected position. The speed at which the reed 5 can return to its normal position in turn, is dependent upon the viscosity of the fluid 2.

During the following half cycle of the alternating current supplied the coil 13, the reed 7 will again be deflected toward the right and the contact 20 will again engage the contact 21 which at the instant of engagement will be moved toward the left by the reed 5 then returning to its normal undeflected position if the reed 5 has not already reached that position. Accordingly, the time of each reciprocatory movement of the reed 7 during which engagement between the contacts 20 and 21 is maintained is determined by the velocity at which the reed 5 is returned to its normally undeflected position, and thereby by the viscosity of the fluid 2.

It will be apparent that the average current flowing through the galvanometer coil 27 from the battery 25 through the circuit previously traced will vary in accordance with the amount of time of each reciprocatory movement of the reed 7 that the contacts 20 and 21 are maintained in engagement. Consequently the extent to which the galvanometer coil 27 is deflected will vary in accordance with the viscosity of the fluid 2. The galvanometer 27 therefore responds to and provides an indication of the total time of engagement between the contacts 20 and 21 during the reciprocatory or oscillatory movements of the reed 7 and may be calibrated in terms of viscosity or fluidity of the fluid 2.

It is noted that when the alternating current supplied the coil 13 is of commercial frequency, that is 25 cycle or 60 cycle alternating current, the frequency of the current energizing pulses to the galvanometer coil will be greater than the period of response of the galvanometer coil 27. As a result the deflection of the galvanometer coil 27 will be steady even though the energizing current impulses to it are intermittent. If it is desired to use alternating current of lower frequency than 25 cycles for energizing the coil 13, or if it is found necessary when alternating currents of 25 or 60 cycles are employed for energizing coil 13, a condenser of suitable value may be connected in shunt to the galvanometer coil 27 for smoothing out the current pulses therethrough and thereby stabilizing the deflection of the coil 27.

It will be apparent that the deflections of the galvanometer coil 27 may be recorded if desired and in Fig. 1 I have shown the galvanometer coil 27 as being provided with a needle or pointer 31 which is disposed in cooperative relation with a recorder chart 32 which is unwound from a roll 33 and is wound on to a roll 34. The roll 34 is driven at a constant speed by a unidirectional electrical motor 35. The motor 35 may be energized in any suitable manner. The energizing connections to the motor 35 have not been shown in order not to complicate the drawings.

The galvanometer pointer 31 is periodically lowered and raised under the control of a depressor bar 36 which is pivotally supported above the pointer 31 at the points 37 and 38 in any suitable manner and is actuated by a suitably configured cam 39 on which the depressor bar rests and which is rotated by any suitable means, for example, by motor 35 through gearing 40 and 41 as shown. A suitable typewriter ribbon 42 is disposed between the galvanometer pointer and the chart 32, preferably directly above the roll 33, so that when the depressor bar 36 moves the pointer 31 downward the latter will press the ribbon 42 against the chart to make a mark thereon. Such mark will be made on each downward movement of the depressor bar to thereby provide a record of the various positions assumed by the pointer 31.

This arrangement for recording the positions to which the galvanometer coil 27 is deflected has only been shown for purposes of illustration. It will be understood that any other arrangement for recording the position of the deflecting element of a galvanometer may be utilized for this purpose.

In practice the relationship between the absolute viscosity of the fluid and the indication obtained by means of the apparatus may be determined by making tests on various fluids having known viscosities, or this relationship can be calculated from the physical dimensions of the apparatus. The adjustment of this relationship to a desired value is usually called a calibration adjustment.

The apparatus of Fig. 1 may be initially calibrated by properly proportioning the size of the paddle 3 and/or by providing a suitable spring of known characteristics in cooperation with the reed 5 for returning the latter to its normal undeflected position. In addition, the rheostat 26 may also be adjusted to vary the extent of deflection of the galvanometer coil 27 produced in response to a given number of engagements and disengagements of the contacts 20 and 21 per unit of time.

It will be apparent to those skilled in the art that the apparatus of the present invention permits taking into consideration all of the factors involved in the mathematical definition of viscosity, namely, force, area of the film parallel to the direction of motion, velocity, and the distance to a stationary film measured along a perpendicular to the direction of motion.

In Fig. 3 I have illustrated more or less diagrammatically a modification of the arrangement disclosed in Fig. 1 for measuring the viscosity of a fluid 2 contained in a receptacle 1 wherein the viscosity of the fluid 2 is compared with the viscosity of a fluid 43 of known value contained in a receptacle 44. The receptacles 1 and 44 may desirably be placed side by side as shown in the drawings or if desired the receptacles 1 and 44 may be located at different levels. A paddle 45 which may be exactly like the paddle 3 is immersed in the fluid 43 and is rigidly connected to a vertically depending and electrically conducting reed 46. The reed 46 is supported at its upper end by a stationary electrically insulating block 47 which in turn is supported in any convenient manner. As shown the structure comprising reeds 5, 7 and 46 may be desirably held rigidly together by means of a bolt 48 which extends through the blocks 6 and 47 and through the reeds 5, 7 and 46 and is provided with a nut 49. In this arrangement also electrically insulating washers 10 and 11 are provided for insulating the reeds 5, 7 and 46 from each other at the blocks 6 and 47.

The reed 7 in Fig. 3 is provided with a second contact 50 on the side thereof opposite the contact 20 and the reed 46 is provided with a contact 51 which in the undeflected position of the reeds is adapted to engage the contact 50. The contacts 50 and 51 are connected to their associated reeds 7 and 46 by means of electrically conducting blocks 52 and 53, respectively. When the reeds 7 and 46 are at rest the contacts 20 and 21 are in engagement and the contacts 50 and 51 are also in engagement.

In this modification the contacts 20 and 21 are connected in one arm of a bridge circuit indicated generally by the reference character 54 and the contacts 50 and 51 are connected in another arm of this bridge circuit. Specifically, the contact 21 is connected through the block 23, reed 5 and a conductor 55 to one end of a resistance 56 and the contact 51 is connected by means of the block 53, reed 46 and a conductor 57 to one end of a resistance 58. The other ends of the resistances 56 and 58 are connected by a conductor 59 in which a galvanometer 60 is inserted to the reed 7 and thereby to the contacts 20 and 50. The galvanometer 60 is provided with a pointer indicated schematically by the arrow 61 and which is adapted to deflect to one side or the other of a normal neutral position upon unbalance of the bridge circuit 54 in one direction or the other. The galvanometer 60 may be generally like the galvanometer shown in Fig. 1.

Energizing current is supplied the bridge network 54 from a battery 62 through a circuit which may be traced from one terminal of the battery 62 through a conductor 63 to the left end terminal of resistance 56, through the bridge network 54 to the right end terminal of the resistance 58 and through a conductor 64 in which a rheostat 65 is inserted to the other terminal of the battery 62. The rheostat 65 may be adjusted for varying the supply of current to the bridge network 54 as desired.

The reed 7 in this arrangement is adapted to be reciprocated by means of a reciprocator or vibrator 4 which may be generally like the vibrator 4 described in connection with Fig. 1.

In the operation of this modified arrangement, upon deflection of the reed 7 toward the right the reed 5 will be moved against its own restraining force and against the restraining action of the fluid 2 against the paddle 3 toward the right. Upon subsequent deflection of the reed 7 toward the left, the reed 5 will follow the movement of the reed 7 but its motion will lag that of the reed 7 by an amount depending upon the viscosity of the fluid 2 and therefore engagement between contacts 20 and 21 will be broken at a point in the return travel of the reeds depending upon the viscosity of the fluid 2. During such motion of the reed 7 toward the left the contact 50 will move into engagement with the contact 51 and cause deflection of the reed 46 to the left. Such deflection of the reed 46 will be produced against its own restraining force and against the restraining action of the standard fluid 43 against the paddle 45. Upon subsequent motion of the reed 7 toward the right the reed 46 will follow the motion of the reed 7 toward the right but will lag behind the reed 7 in accordance with the viscosity of the fluid 43 and as a result the engagement between contacts 50 and 51 will be broken at a point in such return movement of the reed 46 depending upon the viscosity of the fluid 43. During such motion of the reed 46 toward the right the contact 20 will again engage the contact 21 and again produce deflection of the reed 5 toward the right.

This operation causes alternate opening and closing of the opposite arms of the bridge network in which the contacts 20, 21 and 50, 51 are included. The bridge network 54 accordingly will first be unbalanced in one direction and will then be unbalanced in the opposite direction. Such unbalance of the bridge network is not effective to cause deflection of the galvanometer 60 when the time during which the one arm of the bridge circuit is open is the same as the time during which the other arm of bridge circuit is open since the frequency of such opening of the bridge circuit arms is greater than the period of response of the galvanometer 60, and in addition, the galvanometer 60 is alternately energized with equal force for actuation in opposite directions. Consequently, the indicating pointer 61 of the galvanometer 60 will remain stationary when the viscosity of the fluid 2 is exactly the same as that of the fluid 43. If desired, a condenser of suitable value may be connected across the terminals of galvanometer 60 for smoothing out the current impulses therethrough.

When the viscosity of the fluid 2 is different than that of the fluid 43, the time during each reciprocation of the reed 7 during which the contacts 20 and 21 are maintained in engagement will be different from the time during which the contacts 50 and 51 are maintained in engagement, and as a result, the time during which one arm of the bridge circuit 54 is open will be different from the time during which the other arm of the bridge circuit is open. Consequently, the average of the interrupted currents energizing the galvanometer 60 for deflection in one direction will be greater than the average of the interrupted currents energizing the galvanometer for deflection in opposite directions. Accordingly, the deflecting element of the galvanometer will be deflected in one direction from its normal neutral position to indicate the difference in the viscosity of the two fluids 2 and 43. Thus, when the viscosity of the fluid 2 is greater than that of the fluid 43 the deflecting element 61 of the galvanometer 60 will be deflected in one direction from its normal neutral position, and conversely, when the viscosity of the fluid 2 is less than that of the fluid 43, the deflecting element 61 of galvanometer 60 will be deflected in the opposite direction from its normal neutral position.

If desired, reed 7 in Figs. 1 and 3 may be reciprocated in some other manner than by means of the vibrator 4.

For example, as illustrated diagrammatically in Fig. 4, the reed 7 may be reciprocated by a constantly rotating cam 66 which may be rotated at any suitable speed in any desired manner. The cam 66 may be so configured as to give a linear motion to the reed 7, or if desired, it may be so configured as to give any type of motion to the reed 7 and thereby any type of calibration curve desired.

As shown more or less diagrammatically in Fig. 5 the reed 7 and its associated contact 20 may be dispensed with when a cam 66 is provided for imparting reciprocatory movement to the reed 5. In such modification the cam 66 is preferably composed of electrically conducting material and is also employed for the purpose of engaging the contact 21 for opening and closing the circuit to the galvanometer coil 27 in Fig. 1 in lieu of the contact 20.

The adaptation of a cam 66 for imparting reciprocatory motion alternately to two reeds 5 and 46 as disclosed in the arrangement of Fig. 3 is shown diagrammatically in Fig. 6. In this modification the cam 66 is composed of electrically conducting material and is utilized in lieu of the contacts 20 and 50 for alternately opening opposite arms of the bridge circuit 54.

As will be apparent, if the rate at which the cam 66 is rotated in the modifications of Figs. 4, 5 and 6 is suitably high, the galvanometer coil 27 of Fig. 1 or the galvanometer 60 of Fig. 3 will not respond to each individual make and break of the contacts but instead will respond to the average duration of the engagement over a period of time. If it is desired to rotate the cam 66 at a slower rate, however, a condenser of suitable value may be connected in shunt to the galvanometer to stabilize its operation as explained hereinbefore.

While in accordance with the provisions of the statutes, I have illustrated and described the best forms of the embodiments of my invention now known to me, it will be apparent to those skilled in the art that changes may be made in the forms of the apparatus and methods disclosed without departing from the spirit of my invention as set forth in the appended claims, and that in some cases certain features of my invention may be used to advantage without a corresponding use of other features.

Having now described my invention, what I claim as new and desire to secure by Letters Patent is as follows:

1. The method of measuring the viscosity of a fluid which comprises the steps of periodically moving a resilient member, having a portion thereof immersed in the fluid, from a normal undeflected position and measuring the average over a period of time of the length of the intervals required for the member to return to its undeflected position against the restraining action of the fluid.

2. The method of measuring the viscosity of a fluid which comprises the steps of periodically moving a member, having a portion thereof immersed in the fluid, from a normal undeflected position, applying the same force to return said member to its undeflected position following each deflection therefrom, and measuring the average over a period of time of the length of the intervals required for the member to return to its undeflected position against the restraining action of the fluid.

3. The method of measuring the viscosity of a fluid which comprises the steps of periodically moving a resilient member, having a portion thereof immersed in the fluid, from a normal undeflected position, periodically moving a second resilient member, having a portion thereof immersed in a fluid of known viscosity, from a normal undeflected position, and comparing the averages over a period of time of the lengths of the intervals required for the members to return to their normal undeflected positions against the restraining actions of the fluids associated therewith.

4. The method of measuring the viscosity of a fluid which comprises the steps of periodically moving a member, having a portion thereof immersed in the fluid, from a normal undeflected position, periodically moving a second member, having a portion thereof immersed in a fluid of known viscosity, from a normal undeflected position, applying the same force to return said members to their undeflected positions following each deflection therefrom and comparing the averages over a period of time of the lengths of the intervals required for the members to return to their normal undeflected positions against the restraining actions of the fluids associated therewith.

5. A viscosimeter comprising the combination of an electrical indicating device, an electrical energizing circuit for said device, and means to periodically open and close said energizing circuit including a pair of members reciprocating at the same frequency and adapted to contact each other, and thereby close said circuit, for a time during each reciprocation depending upon the viscosity of a fluid under measurement and in which at least one of said members reciprocates.

6. A viscosimeter comprising the combination of an electrical indicating device, an electrical energizing circuit for said device, and means to intermittently open and close said energizing circuit at a rate faster than the period of response of said device including a pair of members reciprocating at the same frequency and adapted to contact each other, and thereby close said circuit, for a time during each reciprocation depending upon the viscosity of a fluid under measurement and in which at least one of said members reciprocates.

7. A viscosimeter comprising the combination of an electrical indicating device, an electrical energizing circuit for said device, and means to intermittently open and close said energizing circuit at a rate faster than the period of response of said device including a pair of members, at least one of which is elongated, reciprocating at the same frequency and adapted to contact each other, and thereby close said circuit, for a time during each reciprocation depending upon the viscosity of a fluid under measurement, said one of said members having one end immersed in the fluid and arranged to have reciprocatory movement imparted thereto from the other reciprocatory member.

8. A viscosimeter comprising the combination of a galvanometer, an electrical energizing circuit for said galvanometer, and means to periodically open and close said energizing circuit at a rate faster than the period of response of said galvanometer including a pair of members, at least one of which is elongated, reciprocating at the same frequency and adapted to contact each other, and thereby close said circuit, for a time during each reciprocation depending upon the viscosity of a fluid under measurement, said one of said members having one end immersed in the fluid and arranged to have reciprocatory movement imparted thereto from the other reciprocatory member.

9. A viscosimeter comprising the combination of an electrical indicating device, an electrical energizing circuit for said device, and means included in said circuit to intermittently open and close the energizing circuit to said device at a rate faster than the period of response of said device including a resilient deflectable member having the deflectable end immersed in a fluid the viscosity of which it is desired to ascertain, and a member reciprocating towards and away from said deflectable member adapted to contact the latter to close said circuit and to impart reciprocatory motion to the deflectable member, the reciprocatory movement of said deflectable member being impeded by the fluid, whereby the time of contact between said members during each reciprocation is dependent upon the viscosity of said fluid.

10. A viscosimeter comprising the combination of an electrical indicating device, an electrical energizing circuit for said device, a pair of contacts included in said circuit adapted to be actuated into and out of engagement with each other to intermittently open and close the energizing circuit to said device at a rate faster than the period of response of said device, and means to actuate said contacts including a resilient deflectable member on which one of said contacts is supported, said deflectable member having a paddle on the deflectable end thereof immersed in a fluid the viscosity of which it is desired to ascertain, a member to support the second contact disposed in cooperative relation with said deflectable member, and means to impart a reciprocatory motion to said second mentioned member towards and away from said deflectable member, whereby reciprocatory motion is transmitted to the deflectable member by means of engagement of said contacts, the reciprocation of said deflectable member and thereby the time of engagement of said contacts during each reciprocation being dependent upon the viscosity of the fluid.

11. A viscosimeter comprising the combination of an electrical indicating device, an electrical energizing circuit for said device, and means to periodically open and close said energizing circuit at a rate faster than the period of response of said device including a pair of deflectable elongated members adapted to contact each other to close said circuit, one of said members being resilient and having its deflectable end immersed in a fluid the viscosity of which it is desired to ascertain, and electrical means to reciprocate the other of said deflectable members to thereby cause contact of said members and reciprocatory movement of said one deflectable member.

12. A viscosimeter comprising the combination of an electrical indicating device, an electrical energizing circuit for said device, a pair of contacts included in said circuit adapted to be actuated into and out of engagement with each other to intermittently open and close the energizing circuit to said device at a rate faster than the period of response of said device, a resilient elongated deflectable member on which one of said contacts is mounted and having a paddle on the deflectable end thereof immersed in a fluid the viscosity of which it is desired to ascertain, and electrical vibratory means to reciprocate the other of said contacts into and out of engagement with said one contact to thereby impart reciprocatory motion to said deflectable member, the reciprocation of said deflectable member and thereby the time of engagement of said contacts during each reciprocation being dependent upon the viscosity of the fluid.

13. A viscosimeter comprising the combination of an electrical indicating device, an electrical energizing circuit for said device, and means to intermittently open and close said energizing circuit at a rate faster than the period of response of said device including a pair of movable members adapted to contact each other to close said circuit, one of said members being resilient and elongated and having an end immersed in a fluid the viscosity of which it is desired to ascertain, and means to reciprocate the other of said members to thereby cause contact of said members and reciprocatory movement of said elongated member.

14. A viscosimeter comprising the combination of an electrical indicating device, an electrical energizing circuit for said device, and means to intermittently open and close said circuit at a rate faster than the period of response of said device including a rotating cam and a resilient member associated with said cam and adapted to be contacted and reciprocated by said cam as the latter rotates, said member having an end immersed in the fluid the viscosity of which it is desired to ascertain and contact between said member and cam operating to close said circuit.

15. A viscosimeter comprising the combination of an electrical bridge network having a pair of contacts in each of two opposed arms and fixed impedances in the remaining arms, an electrical indicating device to indicate the state of balance of said bridge network, means to intermittently effect engagement and disengagement of the contacts of one pair of said contacts including a pair of members reciprocating at the same frequency and adapted to contact each other and thereby close said contacts for a time during each reciprocation depending upon the viscosity of a fluid of known viscosity, and means to intermittently effect engagement and disengagement of the contacts of the other pair of contacts including a pair of members reciprocating at substantially the same frequency as said first mentioned members and adapted to contact each other and thereby close said contacts for a time during each reciprocation depending upon the viscosity of a fluid under measurement.

16. A viscosimeter comprising the combination of an electrical bridge network having a pair of contacts in each of two opposed arms and fixed impedances in the remaining arms, an electrical indicating device to indicate the state of balance of said bridge network, means to intermittently effect engagement and disengagement of the contacts of one pair of said contacts including a pair of reciprocatory members adapted to contact each other to effect engagement of said contacts for a time during each reciprocation depending upon the viscosity of a fluid of known viscosity, means to intermittently effect engagement and disengagement of the contacts of the other pair of contacts including a pair of reciprocatory members adapted to contact each other to effect engagement of said contacts for a time during each reciprocation depending upon the viscosity of a fluid under measurement, and electrical means to reciprocate both pairs of said members.

17. A viscosimeter comprising the combination of an electrical bridge network having a pair of contacts in each of two opposed arms and fixed impedances in the remaining arms, an electrical indicating device to indicate the state of balance of said bridge network, means to intermittently effect engagement and disengagement of the contacts of one pair of said contacts including a pair of reciprocatory members adapted to contact each other to effect engagement of said contacts for a time during each reciprocation depending upon the viscosity of a fluid of known viscosity, means to intermittently effect engagement and disengagement of the contacts of the other pair of contacts including a pair of reciprocatory members adapted to contact each other to effect engagement of said contacts for a time during each reciprocation depending upon the viscosity of a fluid under measurement, and rotating cam means to reciprocate both pairs of said members.

PAUL E. BJORK.